(12) United States Patent
Smith

(10) Patent No.: US 8,181,441 B2
(45) Date of Patent: May 22, 2012

(54) CONTROLLED FAN STREAM FLOW BYPASS

(75) Inventor: J. Walter Smith, Seneca, SC (US)

(73) Assignee: United Technologies Corporation, Hartford, CT (US)

(*) Notice: Subject to any disclaimer, the term of this patent is extended or adjusted under 35 U.S.C. 154(b) by 539 days.

(21) Appl. No.: 12/394,439

(22) Filed: Feb. 27, 2009

(65) Prior Publication Data

US 2010/0218483 A1 Sep. 2, 2010

(51) Int. Cl.
*F02C 7/18* (2006.01)
*F02K 3/04* (2006.01)

(52) U.S. Cl. .......................... 60/204; 60/226.3; 60/266

(58) Field of Classification Search .................. 60/204, 60/226.3, 226.1, 266
See application file for complete search history.

(56) References Cited

U.S. PATENT DOCUMENTS

| | | | |
|---|---|---|---|
| 2,826,895 A * | 3/1958 | English | 60/266 |
| 3,266,243 A * | 8/1966 | Thomas | 60/229 |
| 4,064,692 A * | 12/1977 | Johnson et al. | 60/762 |
| 4,285,194 A | 8/1981 | Nash | |
| 4,409,788 A | 10/1983 | Nash et al. | |
| 4,461,145 A | 7/1984 | Stephens | |
| 4,773,212 A * | 9/1988 | Griffin et al. | 60/772 |
| 4,813,229 A | 3/1989 | Simmons | |
| 4,958,489 A | 9/1990 | Simmons | |
| 4,961,312 A | 10/1990 | Simmons | |
| 5,095,696 A | 3/1992 | Gulati et al. | |
| 5,184,459 A * | 2/1993 | McAndrews | 60/226.3 |
| 5,212,945 A | 5/1993 | Habrard | |
| 5,287,697 A | 2/1994 | Johnson et al. | |
| 5,307,624 A * | 5/1994 | Even-Nur et al. | 60/226.3 |
| 5,343,697 A | 9/1994 | Johnson et al. | |
| 5,687,562 A | 11/1997 | Stewart et al. | |
| 5,694,767 A | 12/1997 | Vdoviak et al. | |
| 5,771,680 A | 6/1998 | Zahedi et al. | |
| 5,775,098 A * | 7/1998 | Philippona | 60/226.3 |
| 5,806,303 A | 9/1998 | Johnson | |
| 5,809,772 A | 9/1998 | Giffin, III et al. | |
| 5,899,058 A | 5/1999 | Narcus et al. | |
| 6,625,989 B2 * | 9/2003 | Boeck | 60/782 |

* cited by examiner

*Primary Examiner* — Ted Kim
(74) *Attorney, Agent, or Firm* — Bachman & LaPointe, P.C.

(57) ABSTRACT

A turbine engine component of a turbofan engine fitted with a bypass air valve includes at least one turbine engine component having a surface with at least one aperture, said turbine engine component located from between a bypass fan duct and a turbine exhaust nozzle of the turbofan engine; a bypass air valve includes a liner concentrically disposed about the turbine engine component and parallel to a centerline of the turbofan engine, the liner has a surface including at least one aperture and at least one impermeable region, and means for actuating the liner about the turbine engine component; and a flow transfer location comprising an area proximate to a turbine exhaust stream flow.

16 Claims, 16 Drawing Sheets

CONTROLLED FAN STREAM FLOW BYPASS

BACKGROUND

The invention relates to high bypass turbofan engines and, more particularly, relates to controlled fan stream flow bypass for high bypass turbofan engines.

Current practice for high bypass ratio turbofan engines is to utilize fixed area exhaust nozzles for both the fan duct stream and the turbine exhaust stream. As lower fan pressure ratios are utilized to achieve improved propulsive efficiency and reduced noise levels, the mis-match between fan operation at cruise conditions and operation at take-off conditions increases. This mis-match can be addressed using conventional approaches, but with a significant increase in weight, cost and complexity.

This mis-match can be explained with respect to the aerothermodynamics involved within the high bypass ratio turbofan engine. FIG. 1 illustrates the change in fan duct stream nozzle flow capacity when going from operation at a cruise Mach Number of 0.85 to static conditions experienced during take-off operation for an engine with a fan pressure ratio of 1.6 at cruise conditions. FIG. 2 illustrates the change in fan operation for static conditions that results from this change in nozzle flow capacity. This change in flow capacity and resulting change in fan operation is the result of losing the benefit of ram pressure ratio due to aircraft flight Mach Number at static conditions. The change in fan operation shown for this example is typical of many operational engines and results in an acceptable loss in fan stall margin and fan flutter margin. Fan flutter margin is the margin of fan pressure ratio between fan operation and the limits where aeromechanical instability occurs. Fan stall margin is the margin of fan pressure ratio between fan operation and the limits where aerodynamic instability occurs.

As the fan pressure ratio at cruise is reduced, ram pressure ratio makes up a much larger fraction of the nozzle pressure ratio, and operation at static conditions results in a much larger change in both nozzle flow capacity and fan operation. FIG. 3 illustrates the change in fan duct stream nozzle flow capacity when going from operation at a cruise Mach Number of 0.85 to static conditions experienced during take-off operation for an engine with a fan pressure ratio of 1.3 at cruise conditions. FIG. 4 illustrates the change in fan operation for static conditions that results from this change in nozzle flow capacity. The change in fan operation shown in this example is that which might be expected for future very high bypass ratio engines, and results in an unacceptable loss in fan stall margin and fan flutter margin. FIG. 5 illustrates how an increase in fan duct stream nozzle area can be used to restore fan operation with acceptable fan stall margin and fan flutter margin. However, as mentioned above, achieving an increase in fan duct stream nozzle area at static conditions using conventional approaches results in significant increases in cost, weight, and complexity.

Therefore, there exists a need to achieve the benefit of varying the fan duct stream area while minimizing the impact of weight, cost and complexity.

SUMMARY

In one aspect of the present disclosure, a turbine engine component of a turbofan engine fitted with a bypass air valve broadly comprises at least one turbine engine component having a surface with at least one aperture, the turbine engine component located from between a bypass fan duct and a turbine exhaust nozzle of the turbofan engine; a bypass air valve broadly comprising a liner concentrically disposed about the turbine engine component and parallel to a centerline of the turbofan engine, said liner having a surface including at least one aperture and at least one impermeable region, and means for actuating the liner about the turbine engine component; and a flow transfer location comprising an area proximate to a turbine exhaust stream flow.

In another aspect of the present disclosure, a process for controlling fan stream flow bypass of a turbofan engine broadly comprises providing a turbine engine component having a surface including at least one aperture, and located from between a bypass fan duct and a turbine exhaust nozzle of the turbofan engine; providing a bypass air valve having a surface including at least one aperture and at least one impermeable region, and concentrically disposed about the turbine engine component and parallel to a centerline of the turbofan engine; introducing a fan exhaust stream flow into the turbofan engine; actuating the bypass air valve to substantially align at least one aperture of the bypass air valve with at least one aperture of the turbine engine component; and permitting flow transfer by substantially aligning at least one apertures and transferring the fan exhaust stream flow into a turbine exhaust stream flow of the turbofan engine at a flow transfer location.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
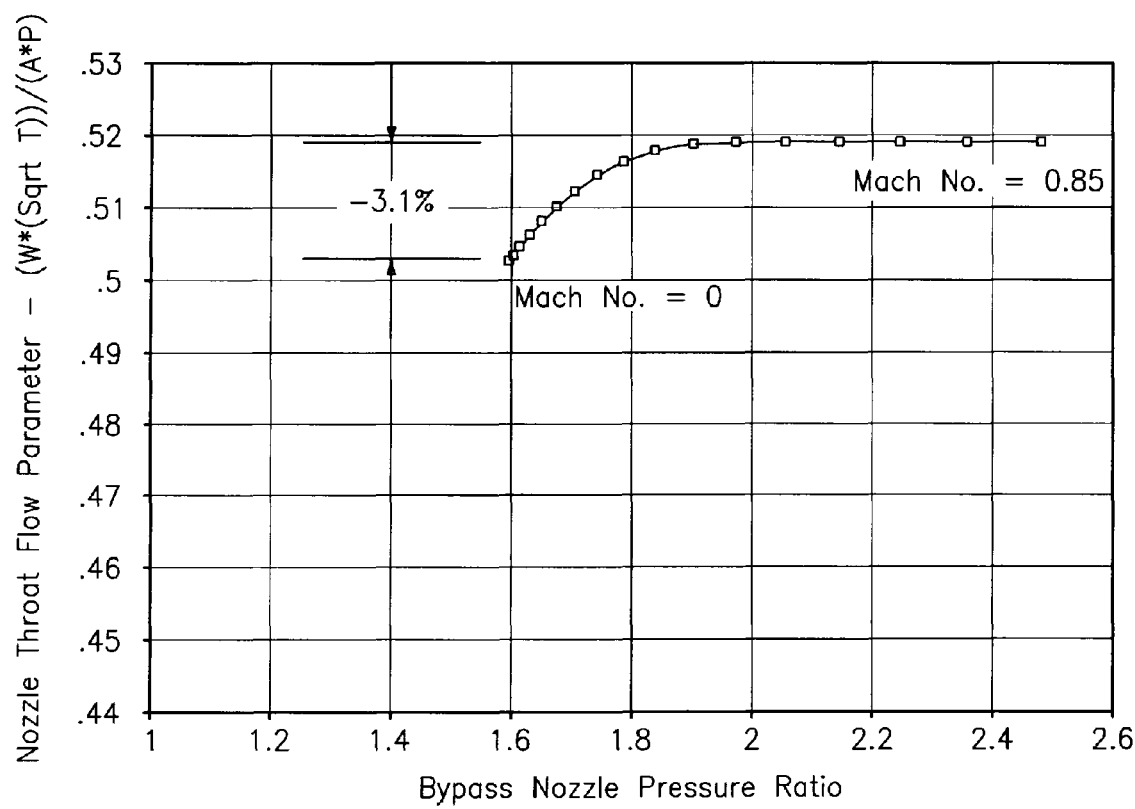
FIG. 1 illustrates a change in fan duct stream nozzle flow capacity from a cruise Mach Number of 0.85 to static conditions experienced during take-off operation for a single stage, high bypass ratio turbofan engine with a fan pressure ratio of 1.6 at cruise conditions.
Figure 2:
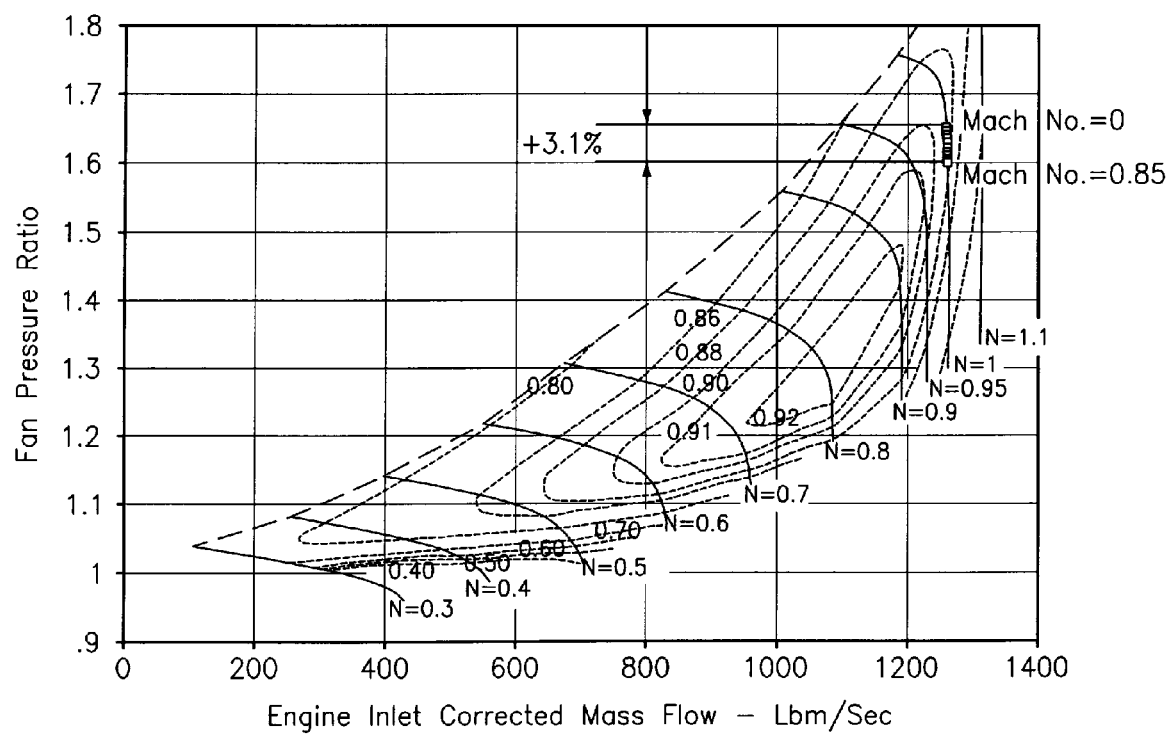
FIG. 2 illustrates the change in fan operation of the engine at static conditions that results from a change in nozzle flow capacity as illustrated in FIG. 1.
Figure 3:
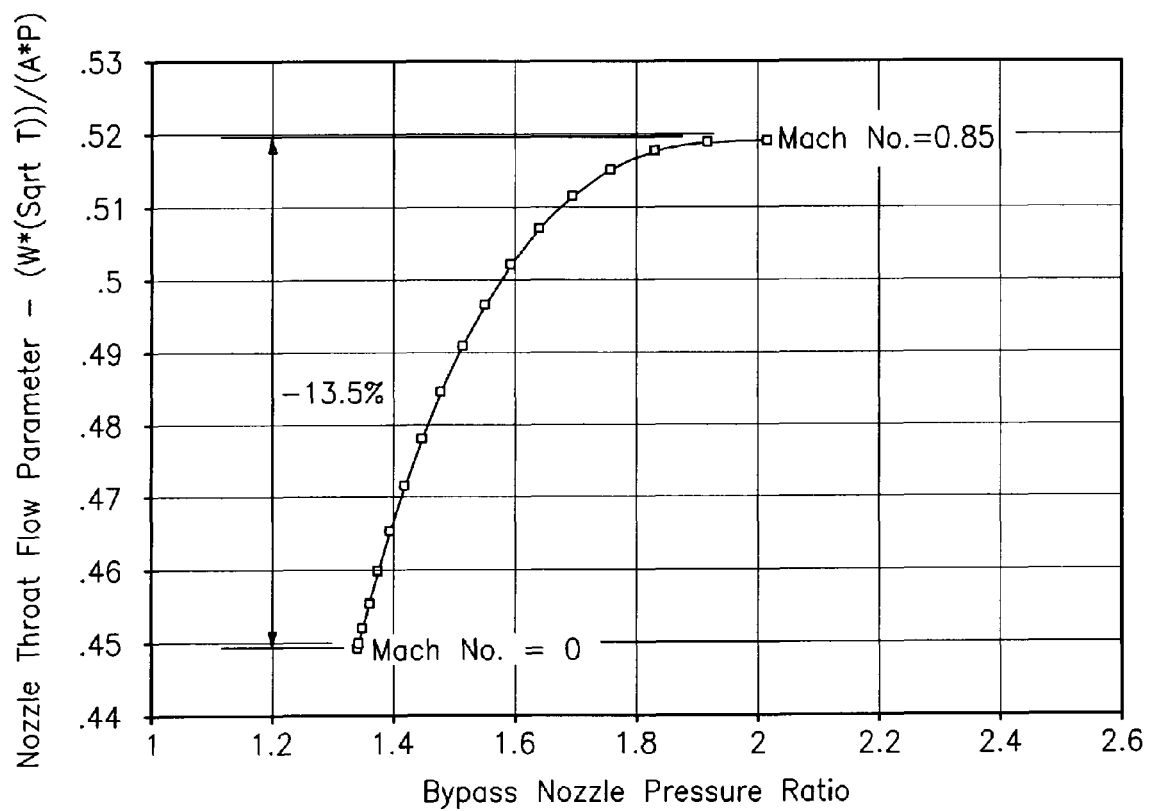
FIG. 3 illustrates a change in fan duct stream nozzle flow capacity from a cruise Mach Number of 0.85 to static conditions experienced during take-off operation for a single stage, high bypass ratio turbofan engine with a fan pressure ratio of 1.3 at cruise conditions.
Figure 4:
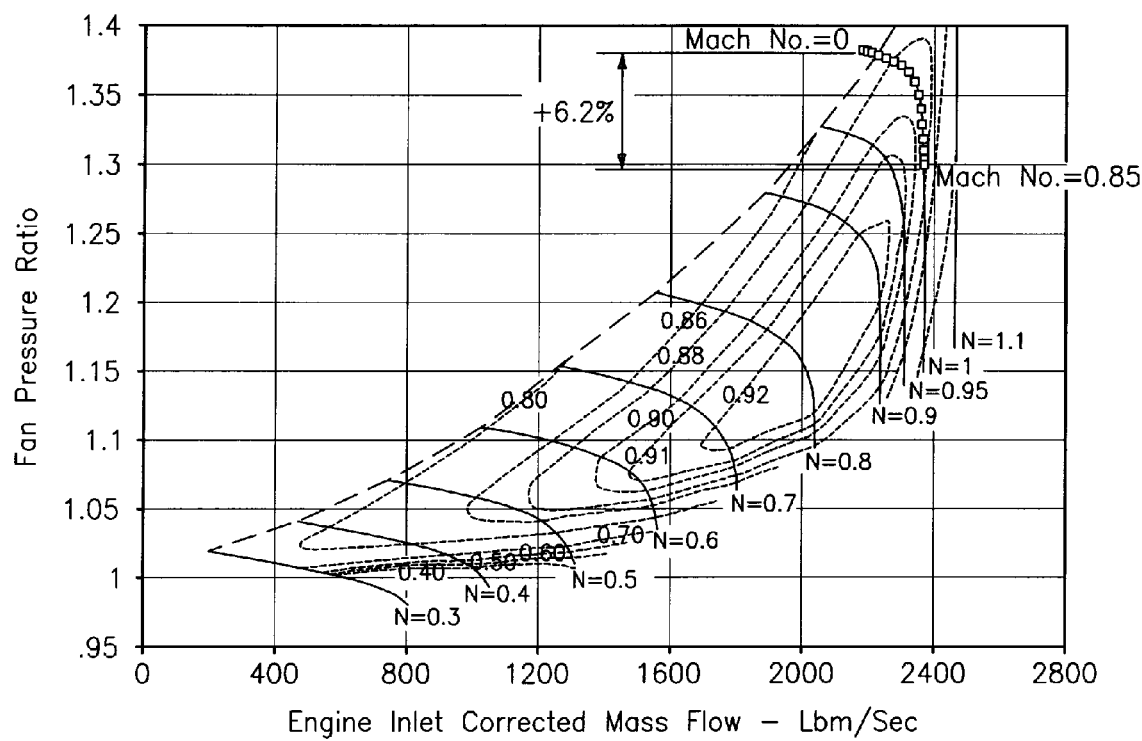
FIG. 4 illustrates a change in fan operation of the engine for static conditions that results from the change in nozzle flow capacity as illustrated in FIG. 3.
Figure 5:
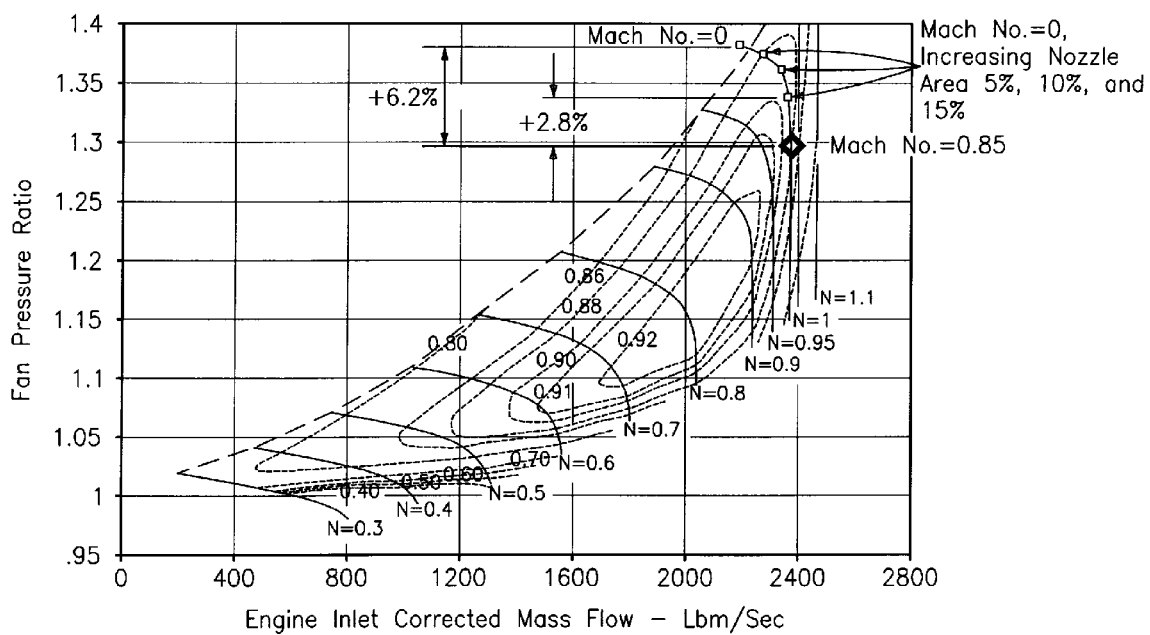
FIG. 5 illustrates how an increase in fan duct stream nozzle area can be used to achieve fan operation with acceptable fan stall margin and fan flutter margin.

Referring now to FIGS. 6 and 7A-7D, a single stage, high bypass ratio turbofan engine 10 may be described as having a gas turbine engine nacelle 11 having disposed within a fan 12, a compressor section 14, a combustor 16, a turbine section 18, a bypass air valve 20, a bypass fan duct nozzle 22 and a turbine exhaust nozzle 24, all disposed concentrically about a centerline 30 of the engine 10. Air exiting the fan 12 is divided between the turbine exhaust stream flow 26 and fan exhaust stream flow 28. Turbine exhaust stream flow 26 follows a path through the compressor section 14, combustor 16, turbine section 18, and turbine exhaust nozzle 24 in that order. Turbine exhaust stream flow 26 may, therefore, be described as following a path substantially parallel to the centerline 30. Fan exhaust stream flow 28 also follows a path parallel to the centerline 30, but instead flows through the fan bypass duct 32 and exits the fan bypass duct nozzle 22. A transfer flow 36 is transferred from the fan exhaust stream flow 28 to the turbine exhaust stream flow 26 through the bypass air valve 20. Selection of the thermodynamic cycle for the engine 10 and the location selected for the transfer of fan exhaust stream flow 28 to the turbine exhaust stream flow 26 can be established so that the transfer flow 36 is at a higher pressure than a pressure of the turbine exhaust stream flow 26 at a flow transfer location 34. Generally, the flow transfer location is the location where the transfer of the fan exhaust stream flow to the turbine engine exhaust stream flow takes place. Various flow transfer locations are illustrated in FIGS. 7A-7D.

Figure 6:
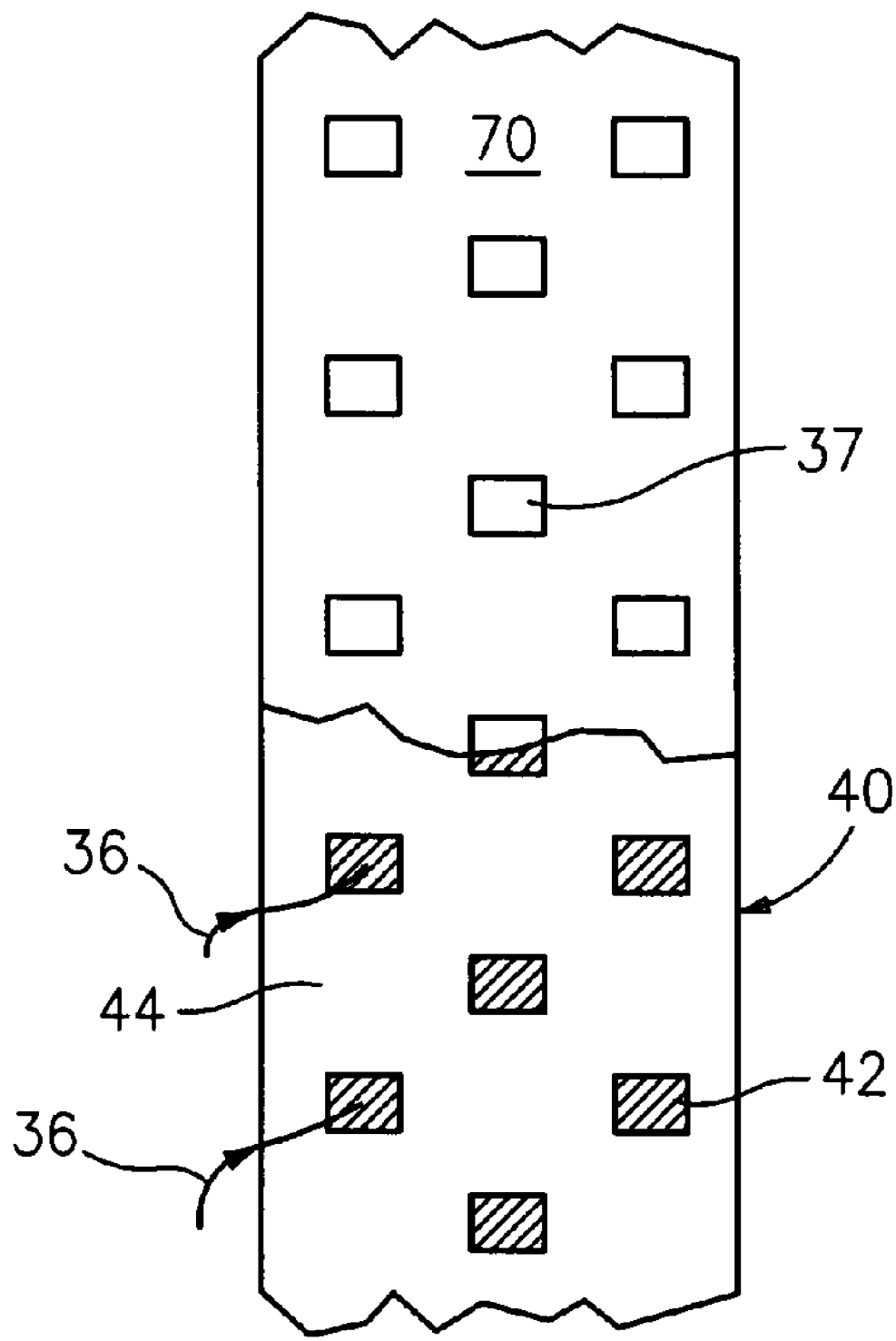
FIG. 6 is a representation of a liner of the bypass air valve of the present disclosure in a spatial relationship to a surface separating the fan duct stream flow from the turbine exhaust stream flow.

As illustrated in FIG. 6, the bypass air valve 20 may comprise a substantially circular shaped liner 40 having at least one aperture(s) 42 and at least one impermeable region 44. The phrase "substantially circular shape" means a shape able to be concentrically disposed about a turbofan engine component such as, but not limited to, a fan bypass duct, a turbine exhaust case, a turbine exhaust nozzle, a bypass air valve support, any component located between the fan bypass duct and turbine exhaust nozzle, and the like.

Figure 7A:
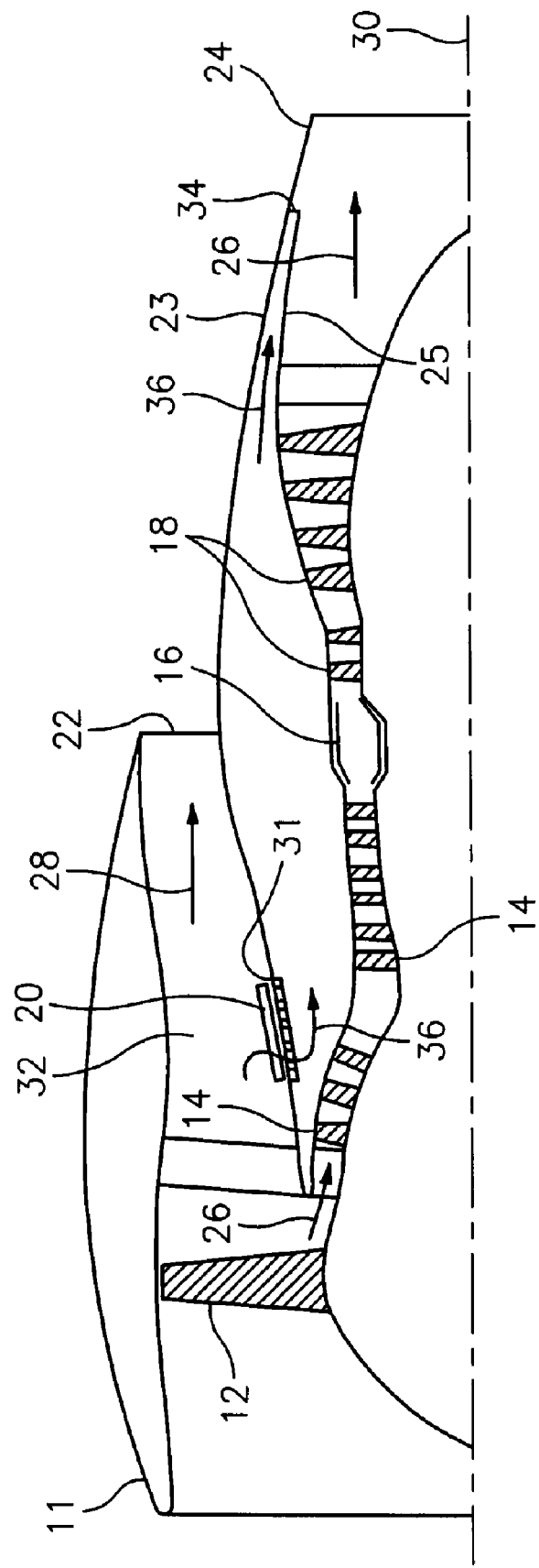
FIG. 7A is a representation of a cross-sectional view of an upper half of a single stage, high bypass ratio turbofan engine equipped with an exemplary embodiment of a bypass air valve of the present disclosure.
Figure 7B:
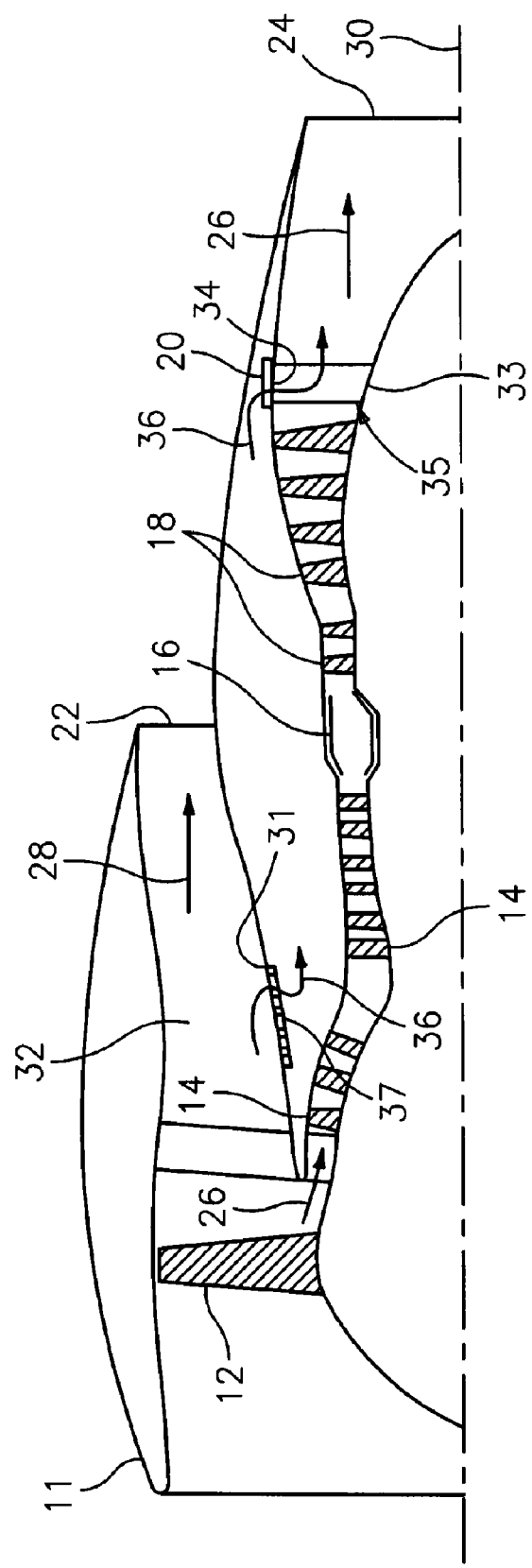
FIG. 7B is a representation of the turbofan engine of FIG. 7A equipped with another exemplary embodiment of a bypass air valve of the present disclosure.
Figure 7C:
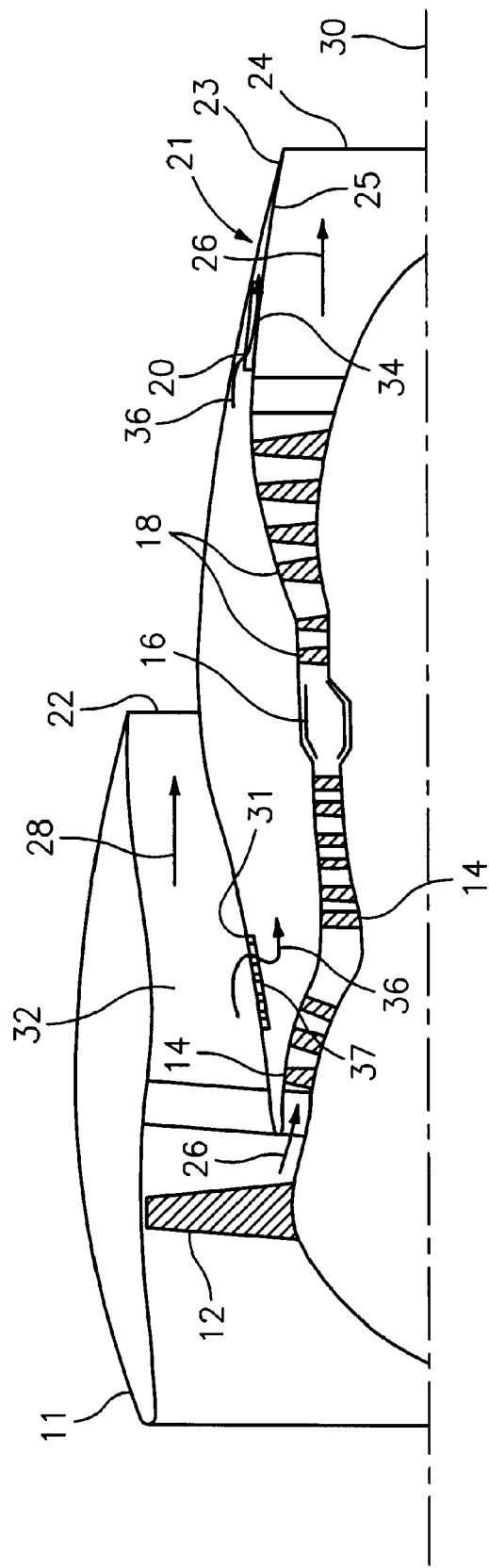
FIG. 7C is a representation of the turbofan engine of FIG. 7A equipped with another exemplary embodiment of a bypass air valve of the present disclosure.
Figure 7D:
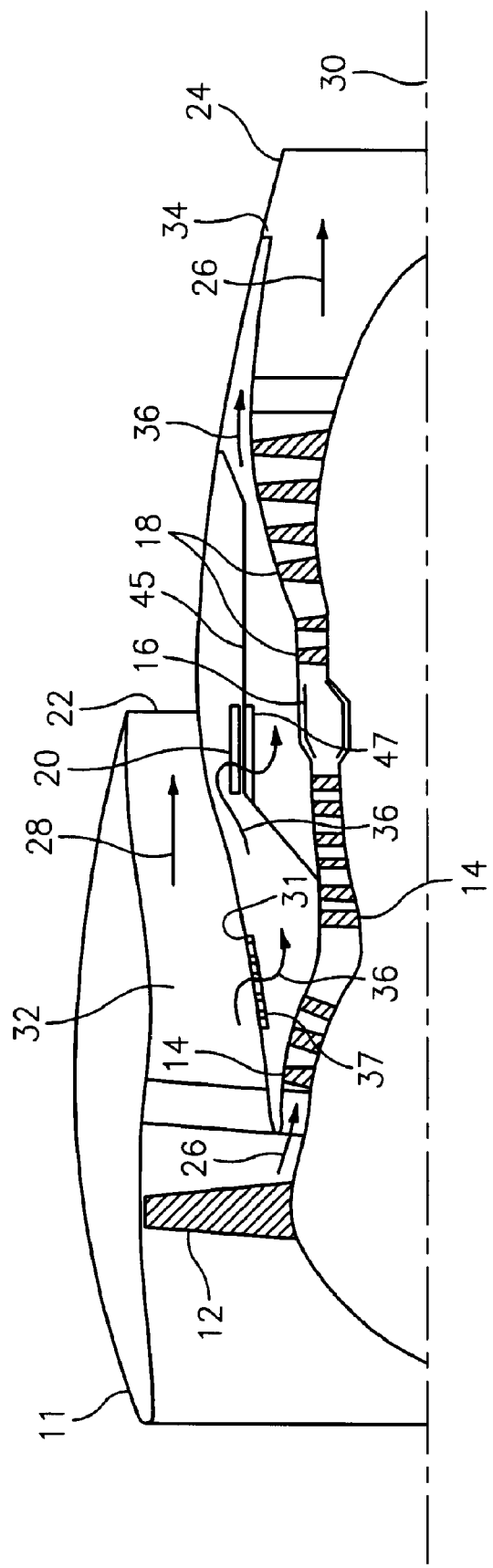
FIG. 7D is a representation of the turbofan engine of FIG. 7A equipped with another exemplary embodiment of a bypass air valve of the present disclosure.
Figure 8A:
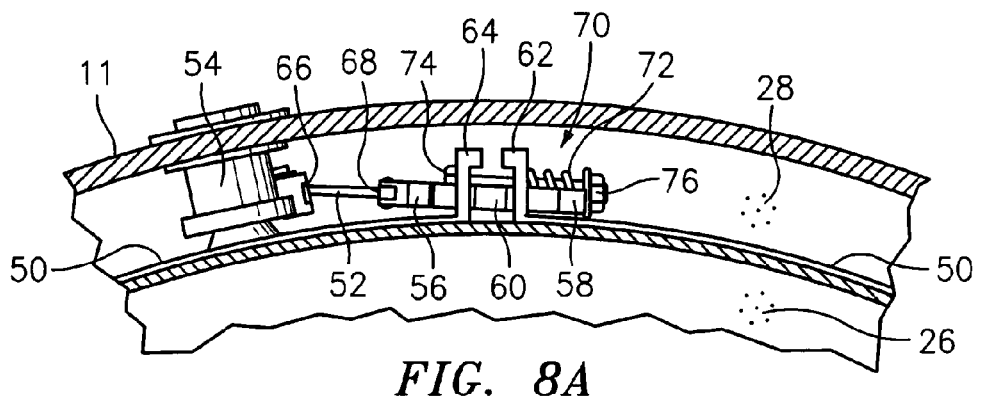
FIGS. 8A-8D are representations of the means for selectively actuating the bypass air valve of the present disclosure in various stages of actuation.
Figure 8B:
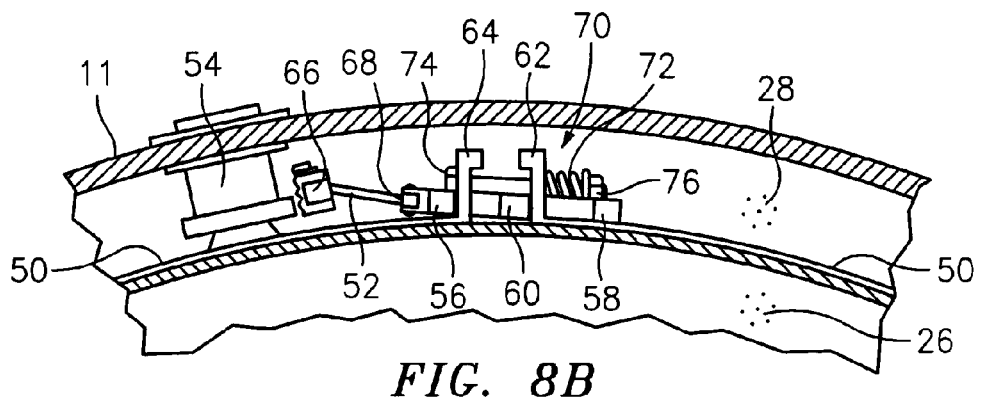
Figure 8C:
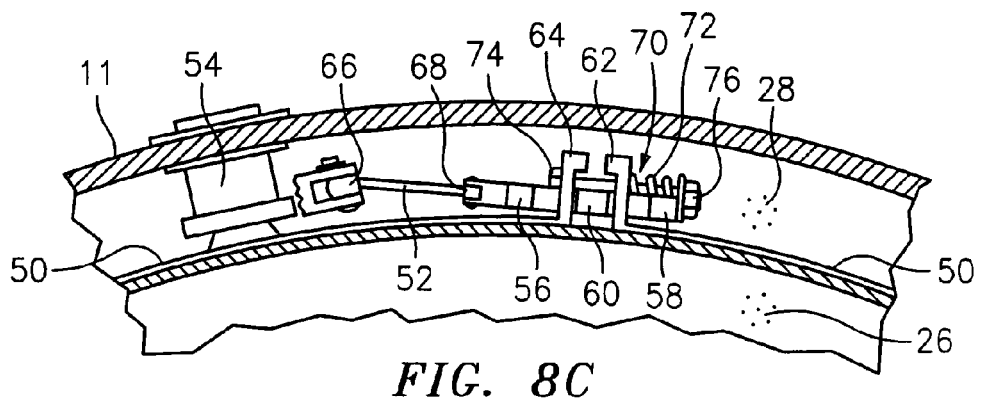
Figure 8D:
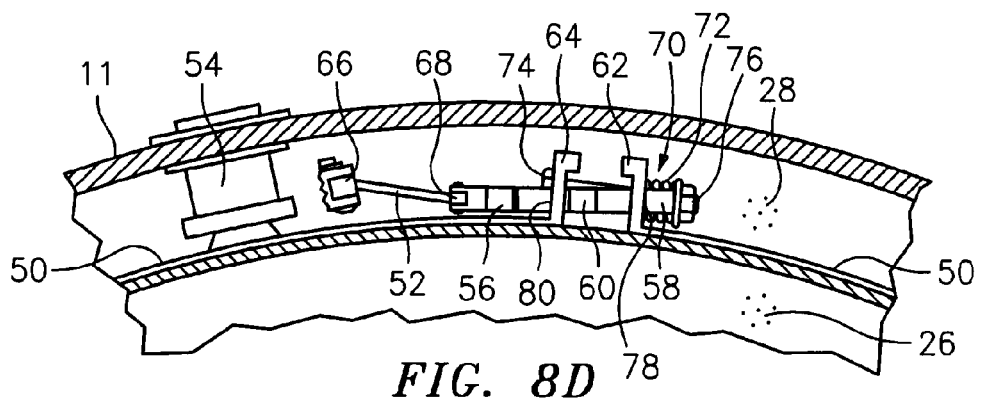
Figure 9:
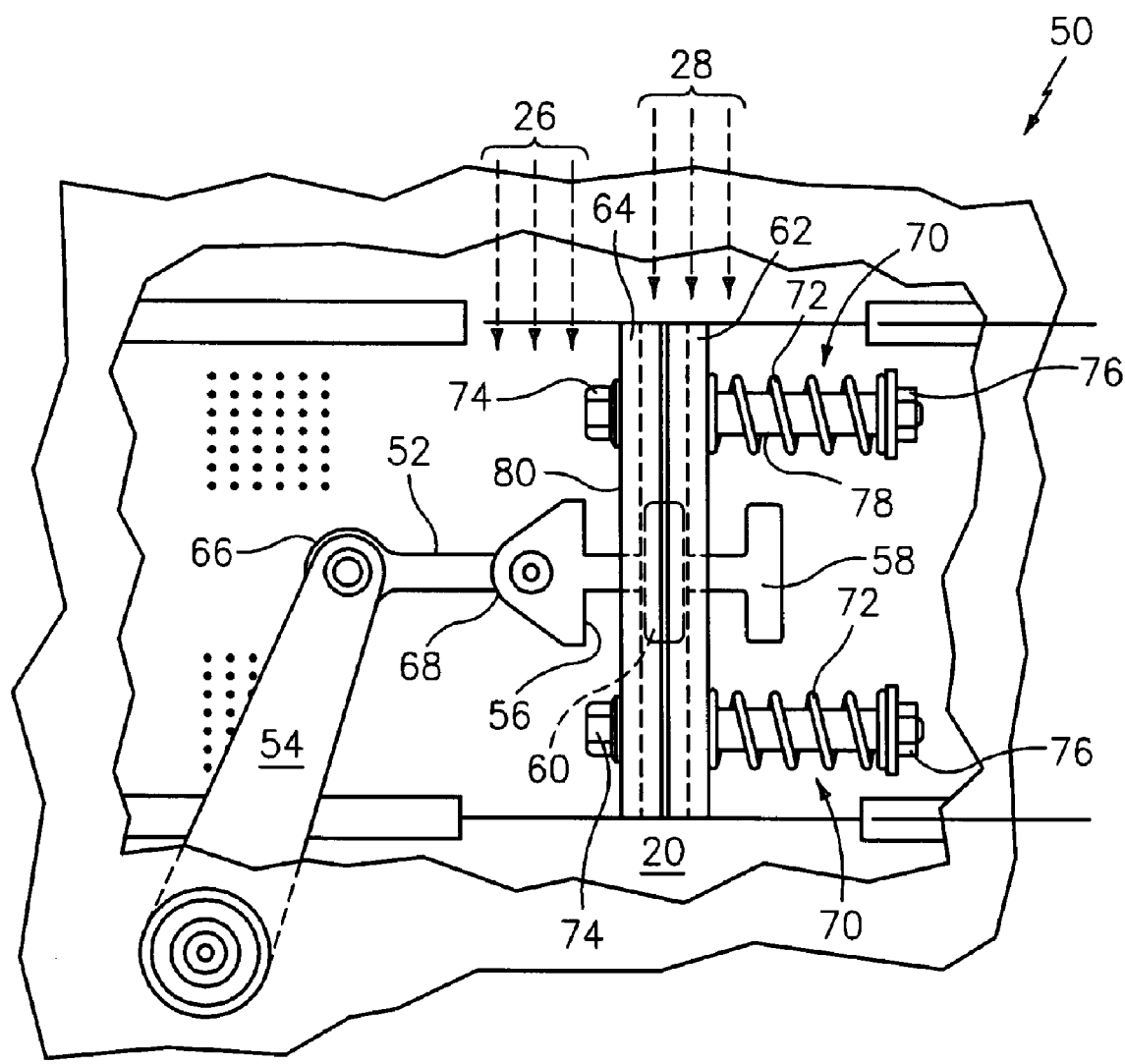
FIG. 9 is another representation of the means for selectively actuating the bypass air valve of the present disclosure.

Referring again to FIGS. 7A-7D, the bypass air valve 20 may be installed at any location from between the fan bypass duct 32 to the turbine exhaust stream nozzle 24. In FIG. 7A, the bypass air valve may be concentrically disposed about an interior surface 31 of the fan bypass duct 32. In FIG. 7B, the bypass air valve may be concentrically disposed about an exterior surface 33 of the turbine exhaust case 35, and the interior surface 31 includes a plurality of apertures 37 described further below. In FIG. 7C, the bypass air valve 20 may be concentrically disposed about an exterior surface 25 of the turbine exhaust nozzle 24 and between the exterior surface 25 and an interior surface 23 of a core nacelle 21 of the nacelle 11. The core nacelle 21 is the portion of the nacelle 11 extending from the combustor section 16 to the turbine exhaust nozzle 24. And, the interior surface 31 includes a plurality of apertures 37 described further below. FIG. 7D illustrates how the bypass air valve 20 may be concentrically disposed about any surface at a location from between the fan bypass duct 32 to the turbine exhaust nozzle 24. For example, surfaces such as surfaces 25, 33 include an area having at least one aperture 37 that are located in a position to either align with at least one aperture 42 or at least one impermeable region 44 of the liner 40 of the bypass air valve 20. The alignment of the apertures 42 and apertures 37 create the aforementioned flow transfer that enters the exhaust stream flow at location 34. In the alternative, a bypass air valve structure 45 may be disposed at a location from between the fan bypass duct 32 to the turbine exhaust stream nozzle 24. The bypass air valve structure 45 is designed to support the bypass air valve 20, provide a surface area 47 having at least one aperture 37 as described above, and provide separation between the fan exhaust flow stream and the turbine exhaust stream flow.

The means for selectively actuating the liner 40 may comprise a means for selectively circumferentially actuating 48 the liner 40 about a turbine engine component, or a means for selectively axially actuating the liner 40 about the turbine engine component along the centerline 30. The means for selectively axially actuating the liner 40 axially about the turbine engine component along the centerline 30 may comprise any type of actuating device capable of such movement as known to one of ordinary skill in the art. A representative means for selectively circumferentially actuating 48 the liner 40 circumferentially may comprise as the mechanism disclosed in U.S. Pat. No. 5,775,098 to Philippona, assigned to United Technologies Corporation, which is incorporated by reference herein in its entirety, and illustrated herein at FIGS. 8A-8D and 9. The range of motion of actuation, whether actuating circumferentially or axially, may be determined by the distance between the apertures 37 of the turbine engine component with respect to the apertures 42 and impermeable regions 44 of the liner 40. For example, the liner 40 may be actuated axially a distance sufficient, e.g., in inches (millimeters) to substantially align the apertures 37 of the turbine engine component with the apertures 42 or impermeable regions 44. Likewise, the liner 40 may be actuated circumferentially a distance, e.g., in degrees (radians), sufficient to substantially align the apertures 37 of the turbine engine component with the apertures 42 or impermeable regions 44.

Referring now to FIGS. 8A-8D and 9, the means for selectively circumferentially actuating 48 is shown. The means for selectively circumferentially actuating 48 may be mounted to the interior surface of the gas turbine engine casing 11 and disposed proximate to the bypass air valve 20 in order to selectively actuate the liner 40 circumferentially, that is, rotate the liner 40 about the turbine engine component. The means for selectively circumferentially actuating 48 may have a strap 50 in contact with the liner 40, and also include pair of spring assemblies 70 and disposed in contact with the strap 50. Each spring assembly 70 may include a spring 72, a bolt 74, and a nut 76. The bolt 74 may extend through the spring 72 and through clearance holes in the first and second flanges 62, 64. The spring 72 may act between the bolt 74 and nut 76 assembly and the outer surfaces 78, 80 of one of the flanges 62, 64. The springs 72 are shown acting between the nuts 76 and the outer surface 78 of the first flange 62. The means for selectively circumferentially actuating 48 may include an arm 52 and a driver 54. The arm 52 may include a first outer bar 56, a second outer bar 58, and a middle bar 60 disposed between the outer bars 56, 58. The outer bars 56, 58 may be spaced equidistant from the middle bar 60. A first flange 62 of the strap 52 is disposed between the middle bar 60 and the second outer bar 58. A second flange 64 of the strap 52 may be disposed between the middle bar 60 and the first outer bar 56. An end 66 of the arm 52 opposite the bars 56, 58, 60 may be pivotally attached to the driver 54. The arm 52 may further include a joint 68 to accommodate any misalignment between the driver 54 and the strap 50 connected to the liner 40 of the present disclosure.

When the bypass air valve 20 is actuated toward the open position, the driver 54 drives the arm 52 in a direction substantially tangential to the circumference of the liner 40. As a result, the middle bar 60 may contact the first flange 62 and drive a segment of the strap 50 out of contact with the liner 40 (see FIG. 8B). The length of the segment depends upon the stiffness of the strap 50 and the magnitude of the forces biasing the strap 50 against the liner 40. After the strap segment has been disengaged from the liner 40, the strap 40 will be translated by either the spring assemblies 70 drawing the second flange 64 in the same direction, or by the first outer bar 56 contacting the second flange 64. After the strap 50 is translated to the open position, the spring assemblies 70 and the pressure against the strap 50 will bias the strap 50 against the liner 40 (see FIG. 8C).

When the bypass air valve 20 is actuated toward the closed position, the driver 54 drives the arm 52 in a direction opposite that taken to open the bypass air valve 20. In doing so, the middle bar 60 may contact the second flange 64 and drive a segment of the strap 50 out of contact with the liner 40 (see FIG. 8D). The strap 50 may be subsequently translated by either the spring assemblies 70 drawing the first flange 62 in the same direction, or by the second outer bar 58 contacting the first flange 62. After the strap 50 is translated to the open position, the spring assemblies 70 and the pressure against the strap 50 bias the strap 50 against the liner 40 (see FIG. 8A).

Using the means for selectively actuating the bypass air valve 20, the liner 40 may be selectively actuated into an open position where the plurality of apertures 42 of the liner 40 may be substantially aligned with the plurality of apertures 37 of the surface(s) 25, 31, 33, 47 of the turbine engine components. The alignment permits transfer flow 36 taken from the fan exhaust stream flow to pass through liner 40 via the plurality of apertures 42 and apertures 37 and enter the turbine exhaust stream at flow transfer location 34. As a result, a decreased fan stream exhaust flow makes the fan bypass nozzle area appear relatively larger, while the increased turbine exhaust stream flow makes the turbine exhaust nozzle area appear relatively smaller. The liner 40 may also be selectively actuated into a closed position, where the at least one impermeable region 44 may be substantially aligned with the apertures 37 thereby impeding and/or ceasing the transfer flow 36 from entering the turbine exhaust stream.

Figure 10:
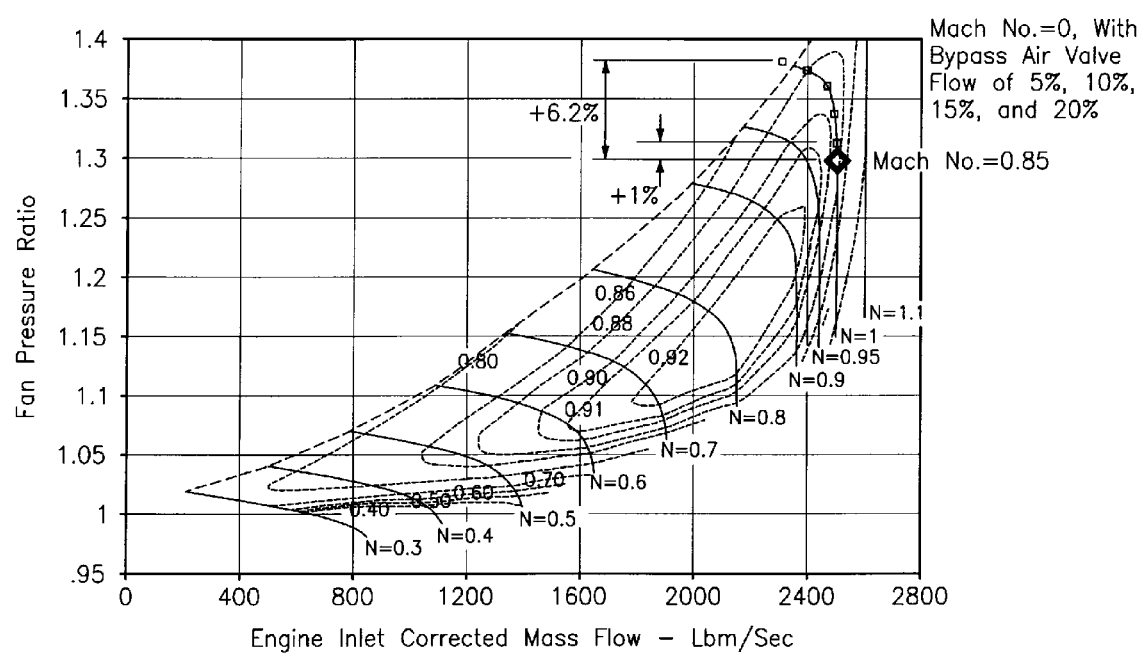
FIG. 10 illustrates how the exemplary liner disclosed herein achieves acceptable fan stall margin and fan flutter margin during fan operation without the use of variable fan duct stream nozzle area.
Figure 11:
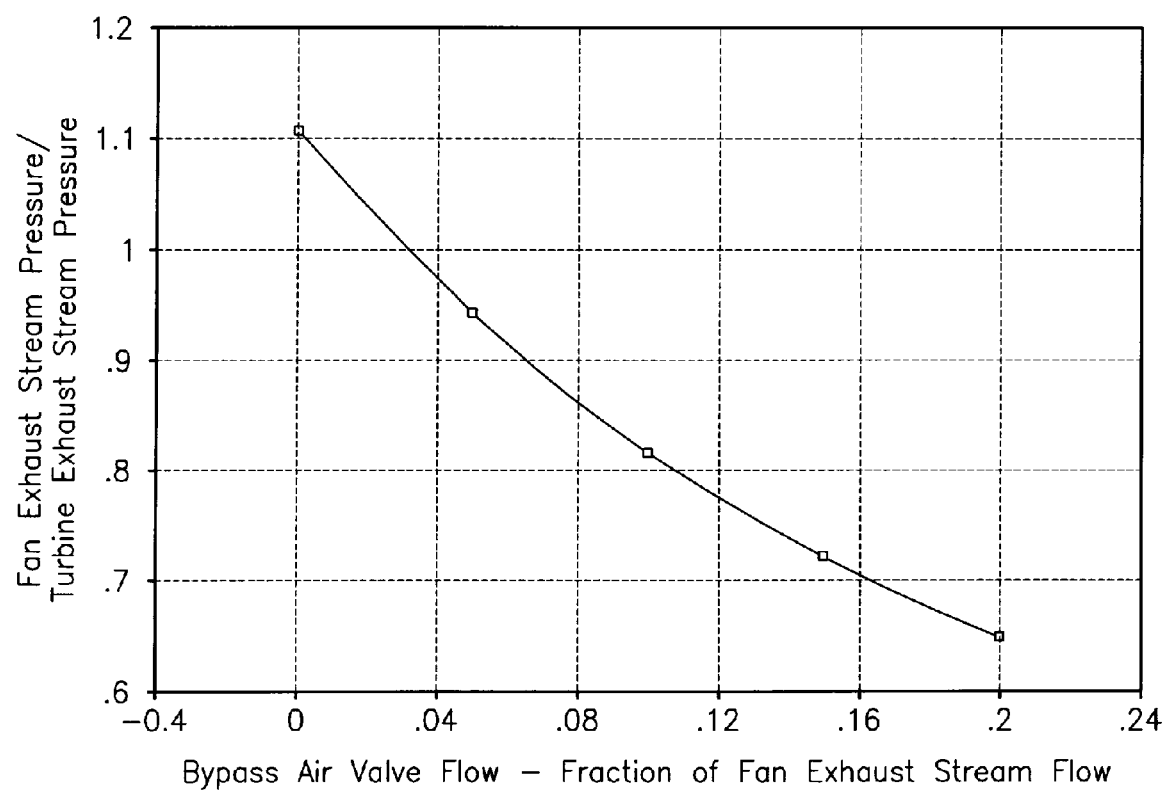
FIG. 11 illustrates a reduction in liner pressure ratio that results with increasing the bypass air valve flow.
Figure 12:
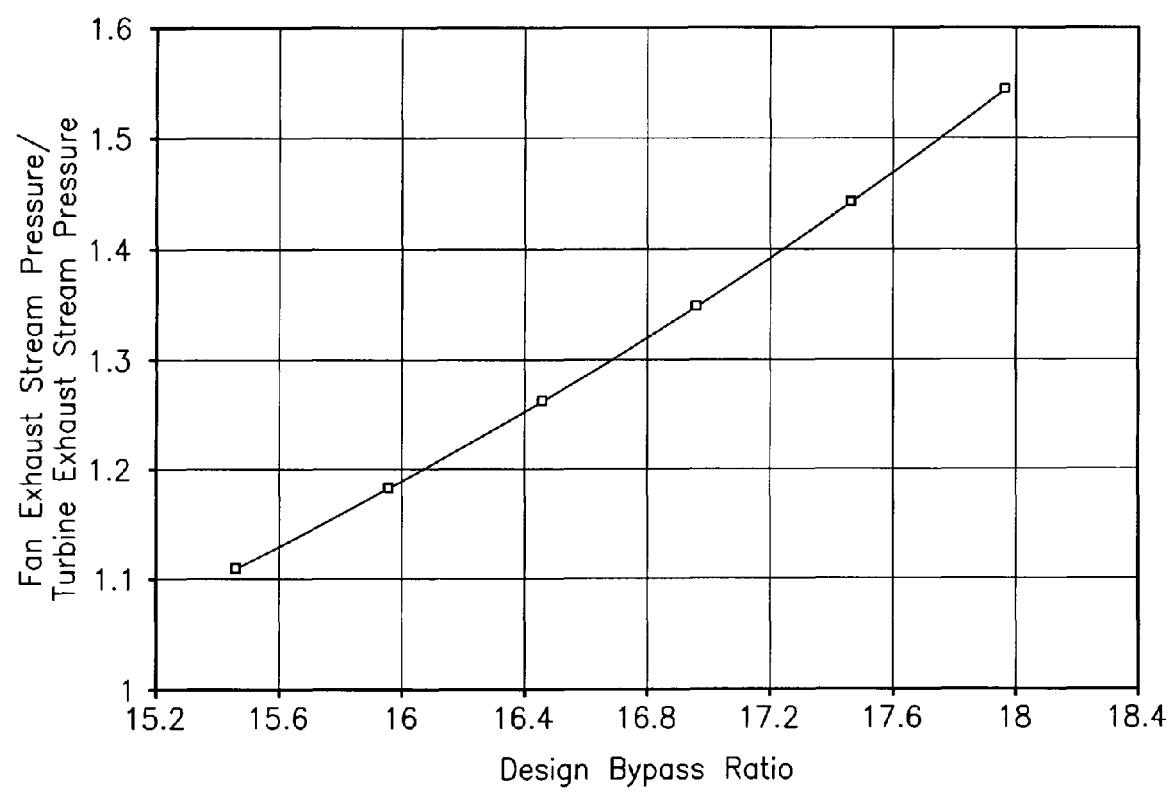
FIG. 12 illustrates how the available liner pressure ratio may be influenced by thermodynamic cycle selection to increase the potential for bypass air valve flow.
Figure 13:
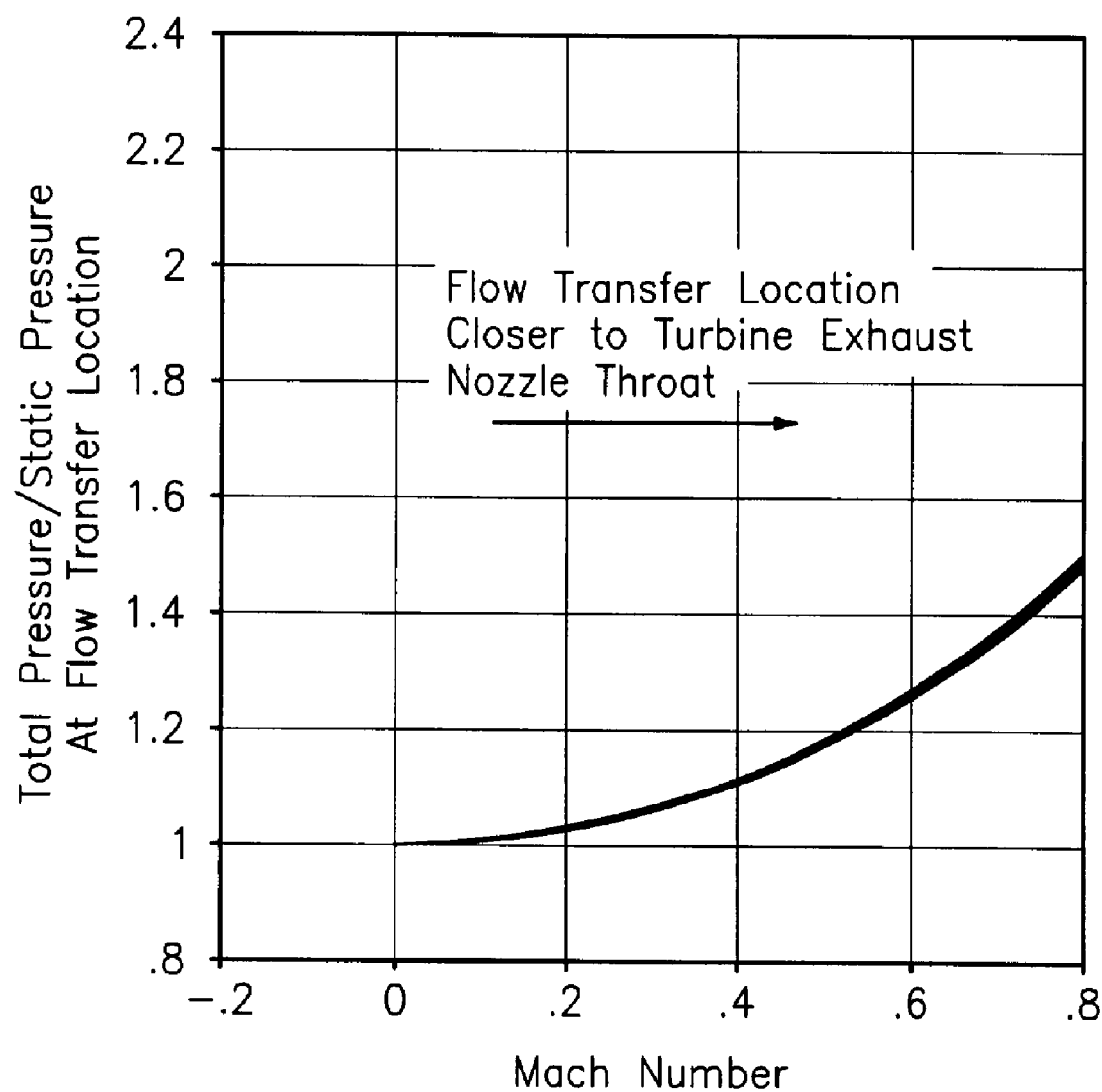
FIG. 13 illustrates how the selection of the location where fan duct stream air enters the turbine exhaust stream may be used to increase the static pressure ratio controlling bypass air valve flow for a given total pressure ratio, thereby increasing the potential for bypass air valve flow.

FIG. 10 illustrates the favorable impact upon fan operation of increasing bypass air valve flow. As bypass air valve flow is increased, the favorable pressure gradient for bypass air valve flow is reduced. FIG. 11 illustrates the reduction in liner pressure ratio that results with increasing bypass air valve flow. This reduction in liner pressure ratio limits the bypass air valve flow, but the available pressure ratio may be favorably influenced by the choice of thermodynamic cycle chosen for the engine and by the selection of the location where bypass air valve flow is injected into the turbine exhaust stream flow. As shown in FIG. 11, a fraction of the fan exhaust stream flow is increased by approximately 10% and a ratio of a fan exhaust stream pressure to a turbine exhaust stream pressure is in turn reduced by approximately 30%. FIG. 12 illustrates how the available liner pressure ratio may be increased by selecting a thermodynamic cycle that produces a higher turbine expansion ratio. As shown in FIG. 12, as design bypass ratio is increased from approximately 15.5 to approximately 17.2 the ratio of fan exhaust stream pressure to a turbine exhaust stream pressure is increased by approximately 30%. FIG. 13 illustrates how bypass air valve flow may be injected into the turbine exhaust stream flow at a higher velocity location to increase the available liner pressure ratio. As shown in FIG. 13, as Mach Number is increased from approximately 0.1 to approximately 0.65 the ratio of total pressure to static pressure is increased by approximately 30% at the flow transfer location.

One or more embodiments of the present invention have been described. Nevertheless, it will be understood that various modifications may be made without departing from the spirit and scope of the invention. Accordingly, other embodiments are within the scope of the following claims.

What is claimed is:

1. A turbine engine component of a turbofan engine fitted with a bypass air valve, comprising:
   at least one turbine engine component having a surface with at least one aperture, said turbine engine component located from between a bypass fan duct and a turbine exhaust nozzle of the turbofan engine;
   a bypass air valve comprising:
   a liner concentrically disposed about said turbine engine component and parallel to a centerline of the turbofan engine, said liner having a surface including at least one aperture and at least one impermeable region, and
   means for actuating said liner about said turbine engine component;
   said bypass air valve being located concentrically around an interior surface of said bypass fan duct and above and about a compressor section of said turbine engine component; and
   a flow transfer location comprising an area proximate to a turbine exhaust stream flow.

2. The turbine engine component of claim 1, wherein said means for actuating comprises means for rotating said liner about said turbine engine component.

3. The turbine engine component of claim 1, wherein said means for actuating comprises means for moving said liner in a forward direction or a backward direction parallel to the centerline along said turbine engine component.

4. The turbine engine component of claim 1, wherein said at least one turbine engine component comprises said bypass fan duct having an interior surface comprising at least one aperture.

5. The turbine engine component of claim 4, wherein in addition to said bypass fan duct an additional turbine engine component comprises any one of the following: a turbine exhaust case, a turbine exhaust nozzle, and a bypass air valve support;
   said additional engine component having a surface with at least one aperture, said additional turbine engine component located from between said bypass fan duct and said turbine exhaust nozzle of the turbofan engine; an additional bypass air valve comprising:

a liner concentrically disposed about said additional turbine engine component and parallel to the centerline of the turbofan engine, said liner having a surface including at least one aperture and at least one impermeable region, and means for actuating said liner about said additional turbine engine component.

6. The turbine engine component of claim 5, wherein said additional turbine engine component comprises said turbine exhaust case having an exterior surface with at least one aperture.

7. The turbine engine component of claim 5, wherein said additional turbine engine component comprises said turbine exhaust nozzle having an exterior surface with at least one aperture.

8. The turbine engine component of claim 5, wherein said additional turbine engine component comprises said bypass air valve support having an exterior surface with at least one aperture.

9. A process for controlling fan stream flow bypass of a turbofan engine, comprising:
   providing a turbine engine component having a surface including at least one aperture, and located from between a bypass fan duct and a turbine exhaust nozzle of the turbofan engine;
   providing a bypass air valve having a surface including at least one aperture and at least one impermeable region, and concentrically disposed about said turbine engine component and parallel to a centerline of the turbofan engine;
   said bypass air valve providing step comprising locating said bypass air valve concentrically around an interior surface of said bypass fan duct and above and about a compressor section of said turbine engine component;
   introducing a fan exhaust stream flow into the turbofan engine;
   actuating said bypass air valve to substantially align said at least one aperture of said bypass air valve with said at least one aperture of said turbine engine component; and
   permitting flow transfer by substantially aligning said at least one apertures and transferring said fan exhaust stream flow into a turbine exhaust stream flow of the turbofan engine at a flow transfer location.

10. The process of claim 9, wherein actuating said bypass air valve comprises rotating said bypass air valve about said turbine engine component.

11. The process of claim 9, wherein actuating said bypass air valve comprises moving said bypass air valve in a forward direction or a backward direction parallel to the centerline along the turbine engine component.

12. The process of claim 9, wherein permitting said flow transfer further comprises effectively increasing a fan exhaust stream nozzle area within said fan exhaust stream flow without altering a fan exhaust nozzle and effectively decreasing a turbine exhaust stream nozzle area within said turbine exhaust stream flow without altering a turbine exhaust nozzle.

13. The process of claim 9, further comprising the steps of:
   actuating said bypass air valve to substantially align said at least one impermeable region with said at least one aperture of said turbine engine component; and
   ceasing the transfer of said fan exhaust stream flow into said turbine exhaust stream flow.

14. The process of claim 13, wherein ceasing the transfer further comprises effectively decreasing a fan exhaust stream nozzle area within said fan exhaust stream flow without altering a fan exhaust nozzle and effectively increasing a turbine exhaust stream nozzle area within said turbine exhaust stream flow without altering a turbine exhaust nozzle.

15. The process of claim 9, further comprising increasing a design bypass ratio to increase the ratio of a fan exhaust stream pressure to a turbine exhaust stream pressure.

16. The process of claim 9, further comprising selecting a flow transfer location exhibiting an increased Mach Number to provide an increased ratio of a total pressure to a static pressure at said flow transfer location.

* * * * *